Nov. 8, 1927.
E. R. GRAHAM
1,648,117
ADJUSTABLE WALL BRACKET HANGER FOR ELECTRIC FIXTURES
Filed Oct. 18, 1926
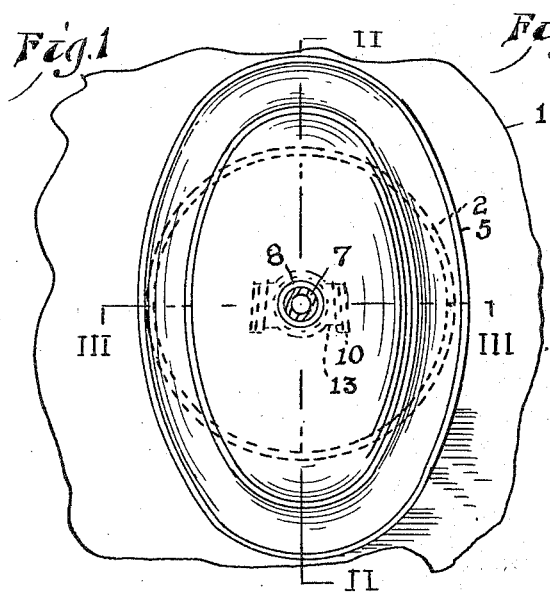
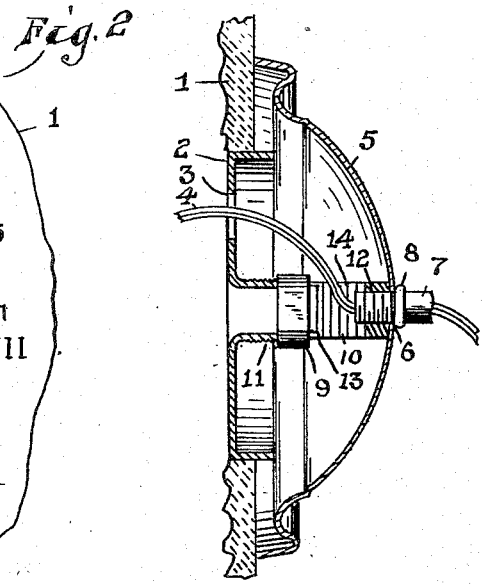
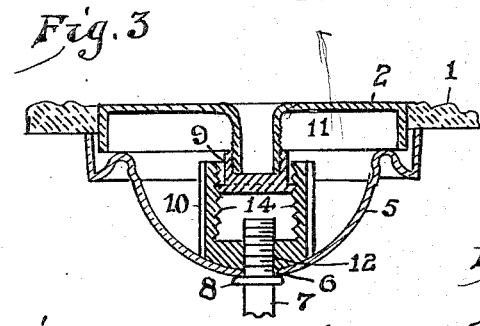
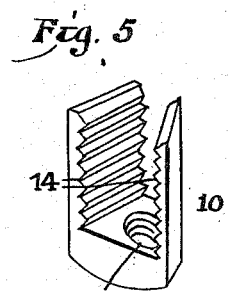
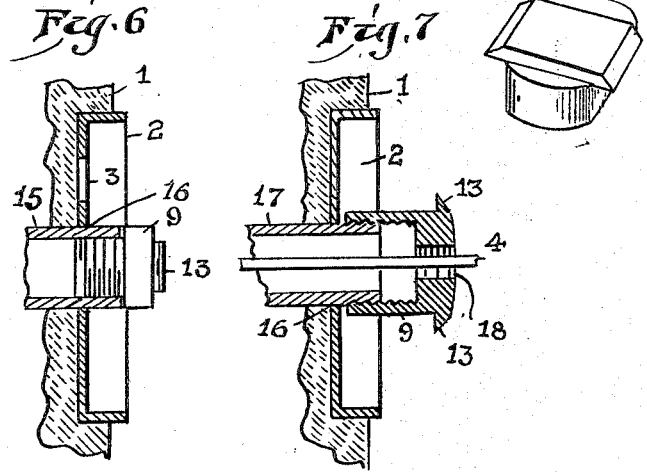
INVENTOR.
Edmar R. Graham,
BY Edward A. Lawrence.
his ATTORNEY Patented Nov. 8, 1927.

1,648,117

UNITED STATES PATENT OFFICE.

ELMER R. GRAHAM, OF PITTSBURGH, PENNSYLVANIA, ASSIGNOR OF ONE-HALF TO ALBERT R. MILITZ, OF PITTSBURGH, PENNSYLVANIA.

ADJUSTABLE WALL-BRACKET HANGER FOR ELECTRIC FIXTURES.

Application filed October 18, 1926. Serial No. 142,260.

The object which I have in view is the provision of improved means whereby an electric fixture may be expeditiously and firmly secured to a wall without the use of tools and may be as expeditiously dismounted therefrom.

For this purpose I provide a new and improved hanger connection comprised of a stud, which may be fixed to the wall or to the canopy and which is provided with a pair of diametrically opposed locking fingers, and a yoke member which may be fixed to the canopy or wall and whose arms are provided on their adjacent faces with series of teeth disposed at substantially right angles to the axis of the yoke and arranged in opposed pairs. When the fixture is to be mounted on the wall, the fingers are engaged with the proper pair of teeth to hold the canopy snug against the wall.

By forming the yoke of spring metal, the canopy may be fixed in place snugly against the wall by simply pushing it in that direction, the fingers of the stud spreading the yoke arms apart and engaging the proper pair of opposed teeth to hold the canopy snugly in place.

However I prefer to cause the arms of the yoke to diverge upwardly, so that when the canopy has been placed flat against the wall, a downward movement of the same will cause the fingers to engage the proper teeth of the yoke and to be wedged into snug engagement therewith, thus locking the fixture and canopy to the wall.

A relative vertical movement between the yoke and the stud parallel to the plane of the teeth will disengage the fingers from the teeth and thus release the fixture.

In the accompanying drawings, wherein I have illustrated the best embodiment of the principles of my invention now known to me, Fig. 1 is a front elevation showing a portion of a wall with a fixture canopy mounted against the same, the connection being indicated in dotted lines; Figs. 2 and 3 are sections taken along the lines II—II and III—III, respectively, in Fig. 1; Figs. 4 and 5 are enlarged perspectives respectively of the stud and the yoke member of the connection; Fig. 6 is a section showing the attachment of the connection stud to the protruding end of a gas pipe, and Fig. 7 is a similar view showing the stud connected to an electric conduit.

Referring first to Figs. 1 to 6, inclusive, 1 represents the wall and 2 the usual metal connection pan. The pan where possible is sunk into the wall with its open front flush with the wall surface, but frequently, as, for instance, owing to the presence of studding or joist, the pan protrudes out from the wall to a greater or less degree, as shown in the drawings.

The pan shown in Figs. 1, 2 and 3 is provided with a hole or holes 3 through which the electric wire or wires 4 are led.

5 represents the fixture canopy, the rest of the fixture not being shown. The canopy is provided with an opening 6, usually at its center, which may be employed for leading out the wires 4 to the fixture and also for use in connecting the canopy to the fixture. Thus 7 represents a tube, which may be part of the fixture and which extends inwardly through the opening 6. In the structure shown the degree of insertion of the tube is limited, as by its circumferential lip or flange 8, a member being screwed on the tube up against the inner face of the canopy to lock the tube and canopy together. The wires 4 are led out through the tube to the fixture socket or sockets in the usual manner.

My improved connection comprises the stud 9 and the yoke member 10, one of which, preferably the stud, is fixed relative to the wall, while the other, preferably the yoke member, is mounted on the canopy.

Thus in the form of pan illustrated in Figs. 1, 2 and 3, the same is provided with an axial outwardly extending and exteriorly threaded socket 11 upon which the internally threaded shank of the stud 9 is screwed, while the bridge or base of the yoke member 10 is provided with a threaded hole 12 so that the yoke member may be screwed like a nut on the inner end of the tube 7 against the inner face of the canopy, thus securing the tube and canopy together and attaching the yoke member to the canopy and fixture.

The stud 9 is provided with a pair of diametrically opposed locking fingers 13 which are preferably provided with beveled outer edges, the bevel being faced outwardly as shown in Fig. 4.

The yoke member 10 has flat arms which preferably diverge, as shown in Fig. 5, and the inner faces of said arms are provided with series of teeth 14 which are disposed in opposite pairs.

The canopy and fixture are locked to the wall by an interlocking engagement of the fingers with a pair of the opposed teeth, as best shown in Fig. 3, the engagement being with the pair of opposed teeth which will hold the canopy snugly up against the wall 1.

The yoke may be made of spring metal so that the stud may be forced inwardly between the arms, spreading the same until the canopy fits snugly in place, the fingers automatically engaging the proper teeth.

I prefer to employ the diverging yoke arms arranging the yoke relative to the canopy so that its arms diverge downwardly. Thus by placing the canopy snugly against the wall with the yoke centered above the stud, the canopy may then be locked in place by moving it downwardly so that the yoke arms engage the fingers of the stud from either side and the yoke and stud are thus wedged securely together and the canopy cannot be released unless the canopy be intentionally forced upwardly to release the wedged engagement of the stud and yoke.

The extent of movement of the canopy in such cases either to secure it in place or to release it is very slight, thus avoiding marring the wall surface.

In Fig. 6 I show the end of a gas pipe 15 protruding from the wall through the axial hole 16 of the pan 2. In such cases I prefer to interiorly thread the end of the pipe and provide the stud 9 with an exteriorly threaded shank which is screwed into the same.

In Fig. 7 I show the end of a wiring conduit 17 protruding from the wall through the opening 16 in the pan. In such case I externally thread the end of the conduit and screw the stud 9 thereon, the head of the stud 9 however in such case being cylindrical with an opening 18 for leading the wire or wires 4 from the conduit.

It is apparent that my improved connection automatically adjusts itself to hold the canopy snugly up against the wall, regardless of the degree to which the pan may protrude or the curvature of the canopy.

My improved connection is inexpensive to manufacture and may be installed quickly. The fixture is supported thereby in a rigid manner and accidental release of the connection is impossible.

What I desire to claim is:—

1. An adjustable hanger for attaching electrical wall fixtures in place which comprises a stud extending outwardly from the connection pan and provided with a pair of oppositely disposed and substantially rigid locking fingers, and a yoke member upon which the canopy is mounted, said yoke member having its arms provided with series of teeth arranged in opposite pairs and disposed at substantially right angles to the axis of the yoke member whereby the canopy may be first placed flat against the wall and then moved along the wall until the fingers move into locking engagement with an opposed pair of teeth.

2. An adjustable hanger for attaching electrical wall fixtures in place which comprises a stud extending outwardly from the connection pan and provided with a pair of oppositely disposed and substantially rigid locking fingers, and a yoke member upon which the canopy is mounted, said yoke member having its arms provided with series of teeth arranged in opposite pairs and disposed at substantially right angles to the axis of the yoke member adapted to be engaged by said fingers, the arms of said yoke member being resilient for the purpose described.

3. An adjustable hanger for attaching electrical wall fixtures in place which comprises a stud extending outwardly from the connection pan and provided with a pair of oppositely disposed and substantially rigid locking fingers, and a yoke member upon which the canopy is mounted, said yoke member having its arms provided with series of teeth arranged in opposite pairs and disposed at substantially right angles to the axis of the yoke member whereby the canopy may be first placed flat against the wall and then moved along the wall until the fingers move into locking engagement with an opposed pair of teeth adapted to be engaged by said fingers, the arms of said yoke member converging laterally and being resilient to provide a resilient wedged engagement between the stud and the yoke member.

Signed at Pittsburgh, Pa., this 16th day of October, 1926.

ELMER R. GRAHAM.